(No Model.) 8 Sheets—Sheet 1.

F. N. ETHRIDGE.
MACHINE FOR MARKING MAIL MATTER.

No. 521,564. Patented June 19, 1894.

WITNESSES:
A. D. Harris
P. A. McShane

INVENTOR:
F. N. Ethridge
by Knight Brown Quinsler
Attys (No Model.) 8 Sheets—Sheet 3.

F. N. ETHRIDGE.
MACHINE FOR MARKING MAIL MATTER.

No. 521,564. Patented June 19, 1894.

Fig. 3.

WITNESSES:
A. D. Harrison
J. A. McShane

INVENTOR:
F. N. Ethridge
by Wright Brown Crossley
Attys (No Model.) 8 Sheets—Sheet 4.

F. N. ETHRIDGE.
MACHINE FOR MARKING MAIL MATTER.

No. 521,564. Patented June 19, 1894.

Fig. 4

WITNESSES:
INVENTOR:

(No Model.) 8 Sheets—Sheet 5.
F. N. ETHRIDGE.
MACHINE FOR MARKING MAIL MATTER.

No. 521,564. Patented June 19, 1894.

Fig. 5.

Witnesses:
Inventor:

(No Model.) 8 Sheets—Sheet 6.

F. N. ETHRIDGE.
MACHINE FOR MARKING MAIL MATTER.

No. 521,564. Patented June 19, 1894.

Witnesses:
A. D. Harrison
B. A. McShane

Inventor:
F. N. Ethridge
by Wright Brown Crossley
Attys.

(No Model.) 8 Sheets—Sheet 7.

F. N. ETHRIDGE.
MACHINE FOR MARKING MAIL MATTER.

No. 521,564. Patented June 19, 1894.

Fig-7-

WITNESSES:
INVENTOR:

(No Model.) 8 Sheets—Sheet 8.

F. N. ETHRIDGE.
MACHINE FOR MARKING MAIL MATTER.

No. 521,564. Patented June 19, 1894.

WITNESSES:
A. D. Harrison.
P. A. McShane.

INVENTOR:
F. N. Ethridge

UNITED STATES PATENT OFFICE.

FRANK N. ETHRIDGE, OF BOSTON, MASSACHUSETTS, ASSIGNOR TO THE AMERICAN POSTAL MACHINES COMPANY, OF PORTLAND, MAINE.

MACHINE FOR MARKING MAIL-MATTER.

SPECIFICATION forming part of Letters Patent No. 521,564, dated June 19, 1894.

Application filed October 16, 1891. Serial No. 408,884. (No model.)

*To all whom it may concern:*

Be it known that I, FRANK N. ETHRIDGE, of Boston, in the county of Suffolk and State of Massachusetts, have invented certain new and useful Improvements in Machines for Marking Mail-Matter, of which the following is a specification.

This invention relates to machines for postmarking and canceling the stamps of letters and other pieces of mail matter in which screw conveyers are used to feed the letters to a printing roll and an impression roll which co-operate in printing the letters; and it has for its object to provide a machine in which the printing roll and impression roll shall be normally separated and inoperative, and brought into operative relation with each other by the movement of a letter by the screw feeding devices toward the point where it is operated upon by said printing and impression rolls, the prime object of my invention being to enable each letter as it is moved along by the screw feed to put the printing mechanism into operation, and to keep said mechanism in an inoperative condition until another letter comes into position to be printed.

The invention consists in the improvements which I will now proceed to describe and claim.

In the accompanying drawings, forming a part of this specification.

The same letters of reference indicate the same parts in all the figures.

In the drawings: $a$ represents the supporting frame or standard of the machine, and $b$ represents a horizontally arranged feeding belt upon which the letters are deposited edgewise by a clerk or operator, and by which the letters are fed endwise to the screws $c\ c'$ which feed the letters positively to the printing devices, as hereinafter described.

Figure 11:
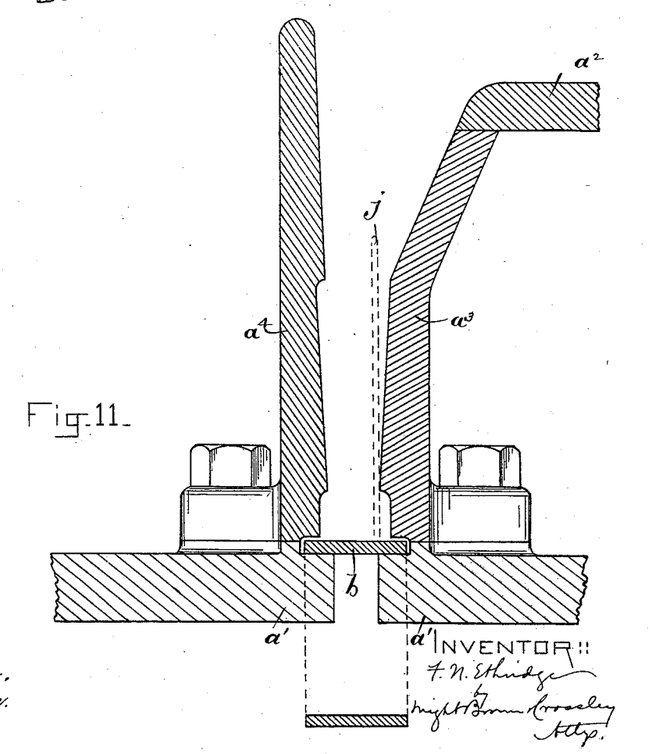
Fig. 11 represents a section on line 11 11, Fig. 1.

The feeding belt $b$ runs on pulleys $b'\ b^2$, and its upper surface is supported by horizontal guides $a'\ a'$, Fig. 11, which are preferably the edges of two horizontal tables forming parts of the supporting frame of the machine. The letters are supplied to the feeding belt from an elevated table $a^2$ arranged at one side of a letter-receiving throat or mouth located over the feeding belt, said throat being formed by two walls $a^3\ a^4$ affixed to the guides $a'\ a'$. The said walls are formed so that the throat between them will receive a letter falling edgewise from the table $a^2$, and will permit the lower edge of the letter to rest upon the belt $b$ without permitting the letter to tip over upon its side. The feeding belt is moved in the direction indicated by the arrows 2 2 in Figs. 1 and 2 by power suitably applied to its supporting pulleys $b^2$, so that each letter dropped upon the belt is carried away from the pulley $b'$ and toward the pulley $b^2$, the speed of the belt being such that the letters acquire sufficient velocity on reaching the pulley $b^2$ to carry them beyond the belt $b$ and into engagement with the screw conveyers $c\ c'$. The conveyer $c$ is located partly below the level of the upper surface of the belt, its convolutions projecting through a slot formed in the bed or table which is arranged to support the letters passing off from the belt, so that each letter delivered by the belt is engaged with two of said convolutions. The shaft $c^3$ which supports the screw $c$ is located so that its upper side is substantially flush with said table and supports the lower edge of each letter engaged with the convolutions of said screw. The screw $c'$ is supported by a shaft $c^4$ which is located at a higher point than the shaft $c^3$, so that the advancing end of each letter that extends across the screw $c$ will enter the space between two of the convolutions of the screw $c'$, and will be arrested by the shaft $c^4$, the relative arrangement of the screws $c$ and $c'$ and their shafts being the same as in Letters Patent of the United States No. 440,401, dated November 11, 1890.

Figures 1, 12:
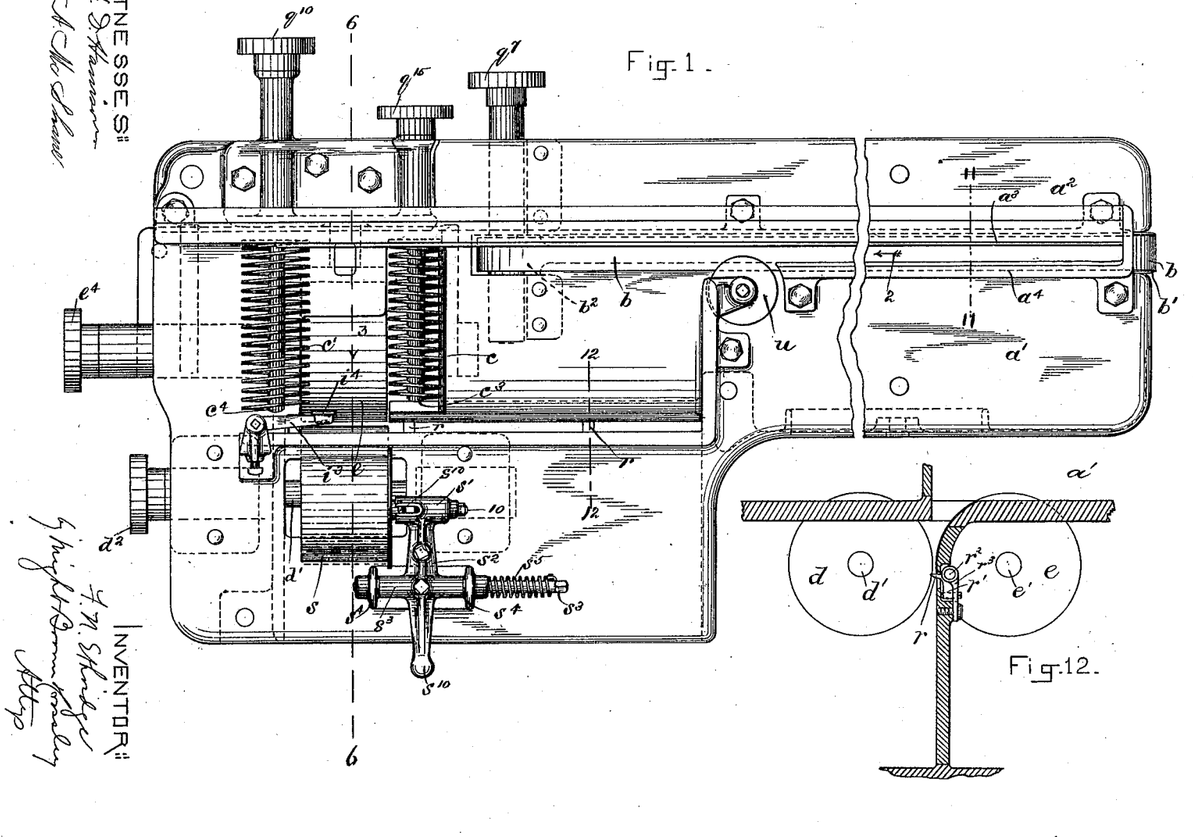
Figure 1 represents a top plan view of a machine embodying my invention.
Fig. 12 represents a section on line 12 12 of Fig. 1.

The screws $c$ and $c'$ are rotated by means hereinafter described in such direction that they will move a letter engaged with their convolutions sidewise in the direction indicated by the arrow 3, Fig. 1, each letter being thus positively moved sidewise out of the path in which it is moved by the feeding belt and toward the printing mechanism, next described.

The printing mechanism comprises a printing roll $d$ which is positively rotated by means hereinafter described in the direction indicated by the arrow 4 in Fig. 6, and carries on its periphery a suitable printing and canceling form or die, and an impression roll $e$ which is arranged opposite the printing roll, and is positively rotated in the direction indicated by the arrow 5 in Fig. 6. The shaft $d'$ carrying the printing roll is journaled in fixed bearings, said roll having no lateral movement; but the shaft $e'$ carrying the impression roll is journaled in bearings in a sliding carriage or carrier $e^2$ which is movable horizontally, so that the impression roll may be moved toward and from the printing roll. The carriage $e^2$ is supported by and is adapted to move on guides $e^3$ $e^3$, Fig. 7, formed on the supporting frame.

Figures 6, 9:
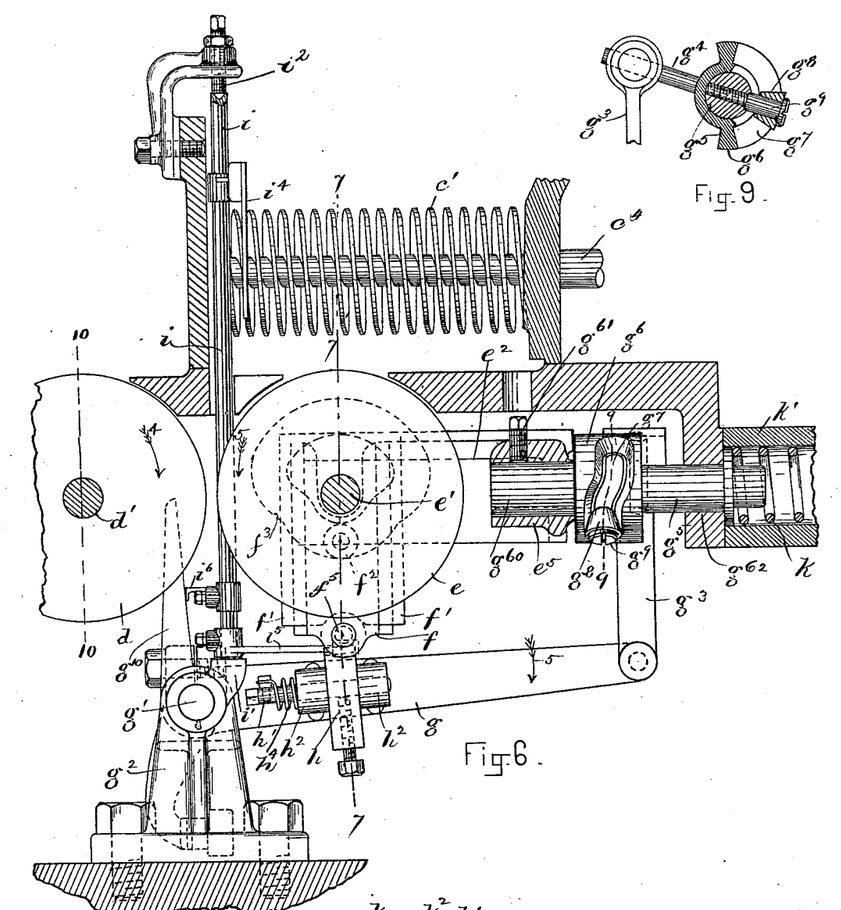
Fig. 6 represents a section on line 6 6, Fig. 1.
Fig. 9 represents a section on line 9, 9, Fig. 6.

The impression roll is normally separated from the printing roll, as shown in Fig. 6, so that the two cannot co-operate in printing a letter, and is moved into operative position by mechanism made operative by the movement of the letter along the feeding screws $c$ $c'$, as presently described, said mechanism including a continuously reciprocating actuating device, an arm or lever which is normally out of contact with said actuating device, and is provided with a dog or clutch which, when moved to a given position, engages the lever with the actuating device, so that the two will move together; mechanism operated by the movement of said lever to force the impression roll toward the printing roll, and a clutch-shifting or moving device arranged to be operated by the movement of a letter by the screws $c$ $c'$, the arrangement being such that each letter as it approaches the delivering ends of the said screws strikes the clutch-shifting device and moves the clutch so as to engage the actuating device with the lever, thus causing a movement of the lever and the movement of the impression roll toward the printing roll; this movement occurring just as the letter is delivered by the screws and drops from the latter between the printing and impression rolls, said rolls being located below the table along which the letters are fed by the screws.

The continuously reciprocating actuating device is a slide $f$ which is reciprocated vertically between guides $f'$ $f'$ affixed to the carriage $e^2$, and is provided with a trundle roll $f^2$ which enters a cam groove $f^3$ in a disk affixed to the impression roll $e$, said cam groove being formed to reciprocate the slide $f$ vertically when said disk is rotated. The lever which is engaged by a clutch with the actuating device, and which causes the movement of the impression roll toward the printing roll, is shown at $g$, and is mounted on a stud or rock-shaft $g'$ which is journaled in bearings in a bracket $g^2$ affixed to the supporting frame. The swinging end of the lever $g$ is connected with a rod $g^3$, one end of which is connected with an arm $g^4$, Fig. 9, affixed to a stud $g^5$, see Fig. 6.

$g^6$ represents a collar formed on a sleeve $g^{60}$ which is fitted in a socket $e^5$ formed on the carriage $e^2$, said sleeve and collar being affixed to the socket $e^5$ by a set screw $g^{61}$. The stud $g^5$ is fitted to rotate in the sleeve $g^{60}$ and in a fixed bearing at $g^{62}$, (Fig. 6.) In one side of said collar $g^6$ is formed a cam-shaped slot $g^7$ which receives a trundle roll $g^8$ on a pin $g^9$ affixed to the stud $g^5$. The collar $g^6$ and its sleeve $g^{60}$ are adapted to move endwise on the stud $g^5$, and when said collar is so moved it will move the carriage $e^2$ and the impression roll $e$ toward or from the printing roll, as the case may be. When the lever $g$ is depressed by the engagement of its clutch, as hereinafter described, with the actuating device $f$, the rod $g^3$, acting on the arm $g^4$, turns the stud $g^5$ in the direction required to cause the trundle roll $g^8$ on said stud, by its engagement with the cam-shaped slot in the collar, to move the collar laterally in the direction required to force the carriage $e^2$ and impression roll $e$ toward the printing roll.

$h$ represents the dog or clutch which engages the lever $g$ with the actuating device $f$. Said dog is affixed to a pin $h'$ journaled in ears $h^2$ $h^2$ on the lever $g$. A spring $h^4$ attached at one end to one of said ears, and engaged at the other end with a stud on the pin $h'$, normally holds said pin and the dog or clutch $h$, which is rigidly attached to the pin, in the position shown in full lines in Fig. 7, the dog being out of the path in which the actuating device $f$ moves. The arrangement of the dog is such that when it is moved from its normal position, its upper end will be moved into the path of a projection $f^5$ on the actuating device $f$, as shown in dotted lines in Fig. 7 so that the downward movement of the said actuating device will cause it to strike the dog $h$, and through the latter depress the lever $g$, with the result above described.

Figure 7:
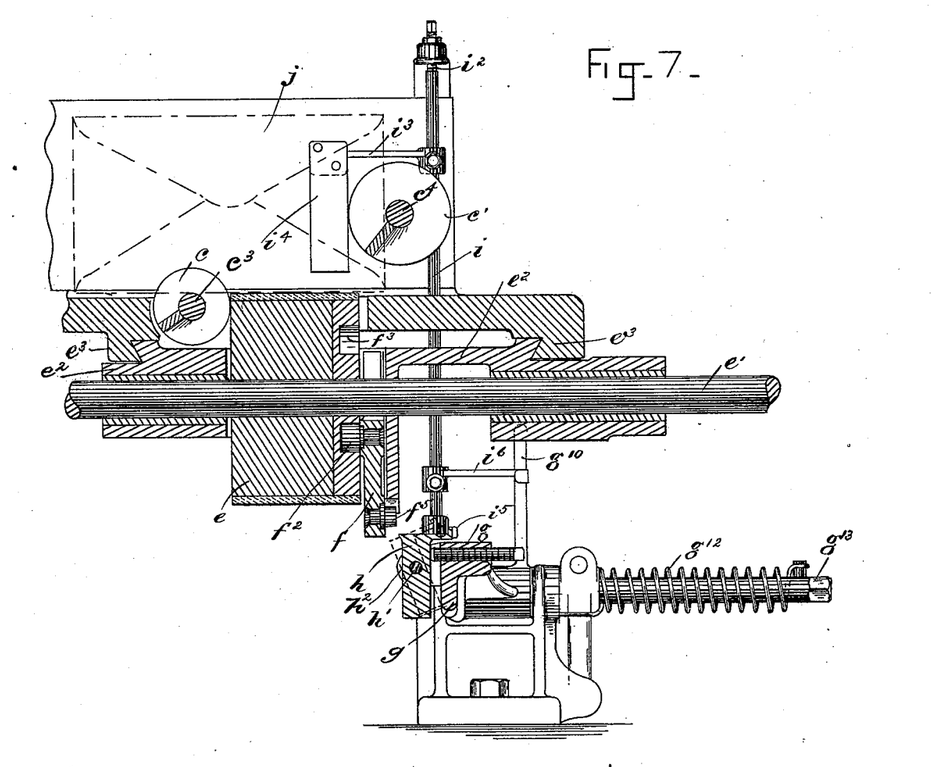
Fig. 7 represents a section on line 7 7, Fig. 6.

The dog or clutch displacing or shifting device, operated by the advance of a letter toward the printing mechanism by the screws $c$ $c'$, comprises a vertical shaft or spindle $i$ supported at its lower end by a step or socket $i'$ affixed to the supporting frame, and at its upper end by a pivot screw $i^2$, also affixed to the supporting frame, an arm $i^3$ affixed to said shaft and provided at its outer end with a plate $i^4$ which stands in the path in which the letters are moved by the screws $c$ $c'$, and an arm $i^5$ affixed to the lower end of the shaft $i$ and arranged to bear against the upper portion of the dog or clutch $h$, the arrangement being such that when a letter $j$, (see dotted lines in Fig. 7,) engaged with and moved by the screws $c\ c'$, reaches a point near the delivering ends of said screws it will strike the plate $i^4$ and move the latter, thus turning the shaft $i$ and moving the arm $i^5$ to a sufficient extent and in the proper direction to force the upper end of the dog $h$ from the position shown in full lines in Fig. 7 to that shown in dotted lines, thereby bringing the said dog into the path of the actuating device $f$.

Figure 8:
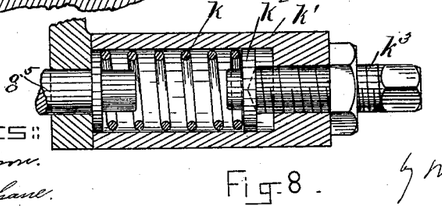
Fig. 8 represents a view of a part of the construction shown in Fig. 6, showing also the part which is omitted or broken away from Fig. 6.

The lever $g$ is provided with an arm $g^{10}$, Figs. 6 and 7, which is arranged to strike an arm $i^6$ affixed to the shaft $i$, when the lever $g$ commences its downward motion, said arms $g^{10}$ and $i^6$ being so arranged that the contact of the arm $g^{10}$ with the arm $i^6$ will turn the shaft $i$ in the direction required to move the arm $i^3$ and its plate $i^4$ away from the letter bearing against it, thus relieving the letter from the pressure exerted upon it by the plate $i^4$, and allowing the letter to drop freely between the printing roll and impression roll. After the depression of the lever $g$, as above described, and the consequent movement of the impression roll toward the printing roll, the dog $h$ is restored to its normal position by the spring $h^4$, said dog, by pressure against the arm $i^5$, turning the shaft $i$ sufficiently to restore the arm $i^3$ and plate $i^4$ to their normal position. The lever $g$ is at the same time raised by the action of a spring $g^{12}$ (Figs. 5 and 7), one end of which is engaged with a fixed stud $g^{13}$, and the other end with the lever $g$, said spring being arranged to exert a sufficient upward pressure on the lever to raise the latter and cause it through the described connections with the sleeve $g^6$ to turn said sleeve in the direction opposite to that in which it was turned by the depression of the lever $g$, and thus move the carriage $e^2$ and impression roll $e$ away from the printing roll $d$. The impression roll is permitted to yield when in operation, and thus accommodate itself to the thickness of the letter passing between it and the printing roll, by means of a spring $k$, Figs. 6 and 8, located in a socket $k'$ affixed to the supporting frame and bearing at one end against a flange or collar on the stud $g^5$, the other end of said spring being supported by an adjustable head $k^2$ in the socket $k'$. A screw $k^3$, working in a tapped orifice in the end of said socket, adjusts the head $k^2$ and thus varies the pressure of the spring. It will be seen that the spring $k$ constitutes a yielding support for the carriage $e^2$ and impression roll $e$, and enables said impression roll to yield to any extent required by variations in the thickness of the pieces of mail matter.

Figure 2:
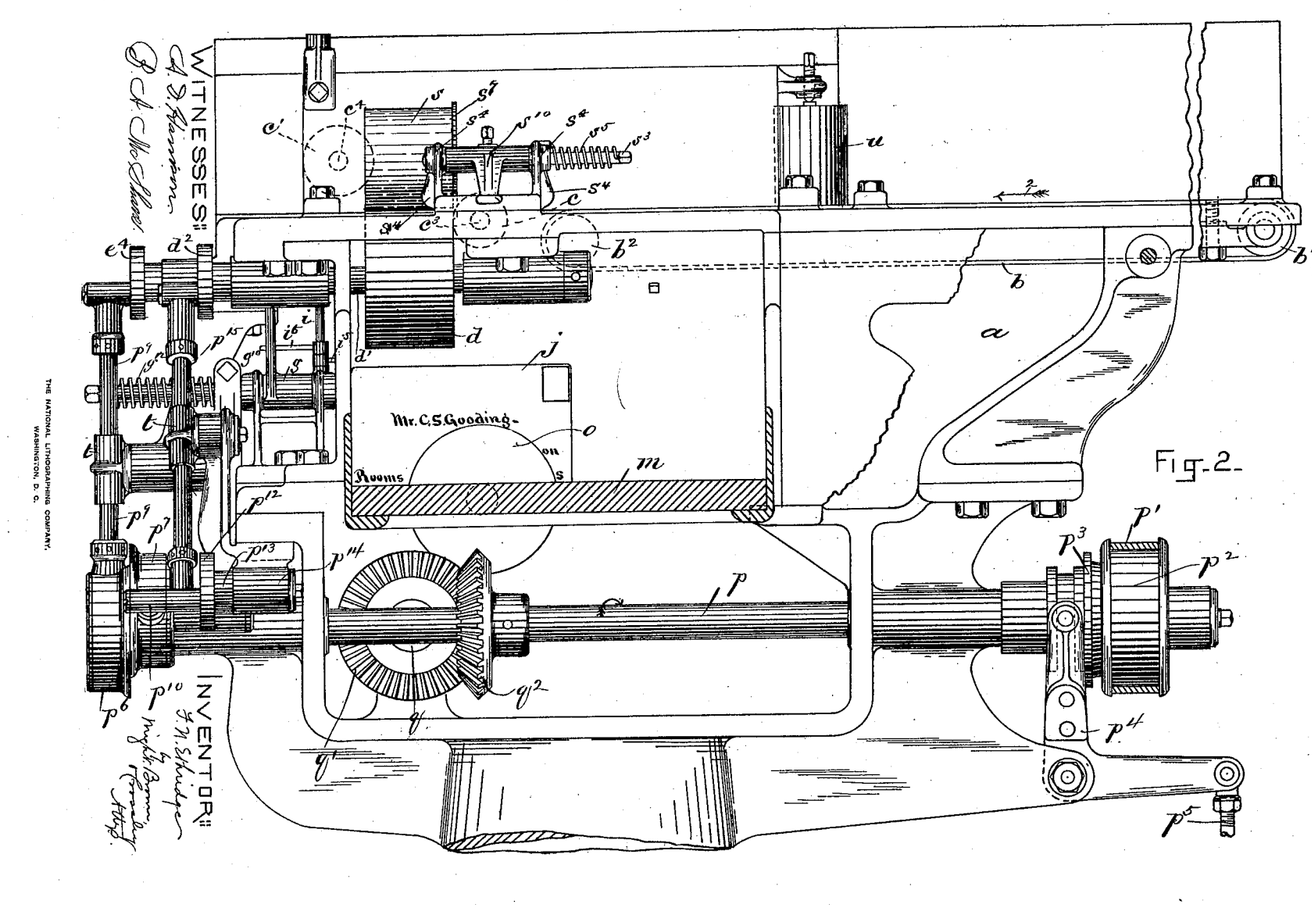
Fig. 2 represents a front elevation of the same, showing the packing table in section.
Figure 4:
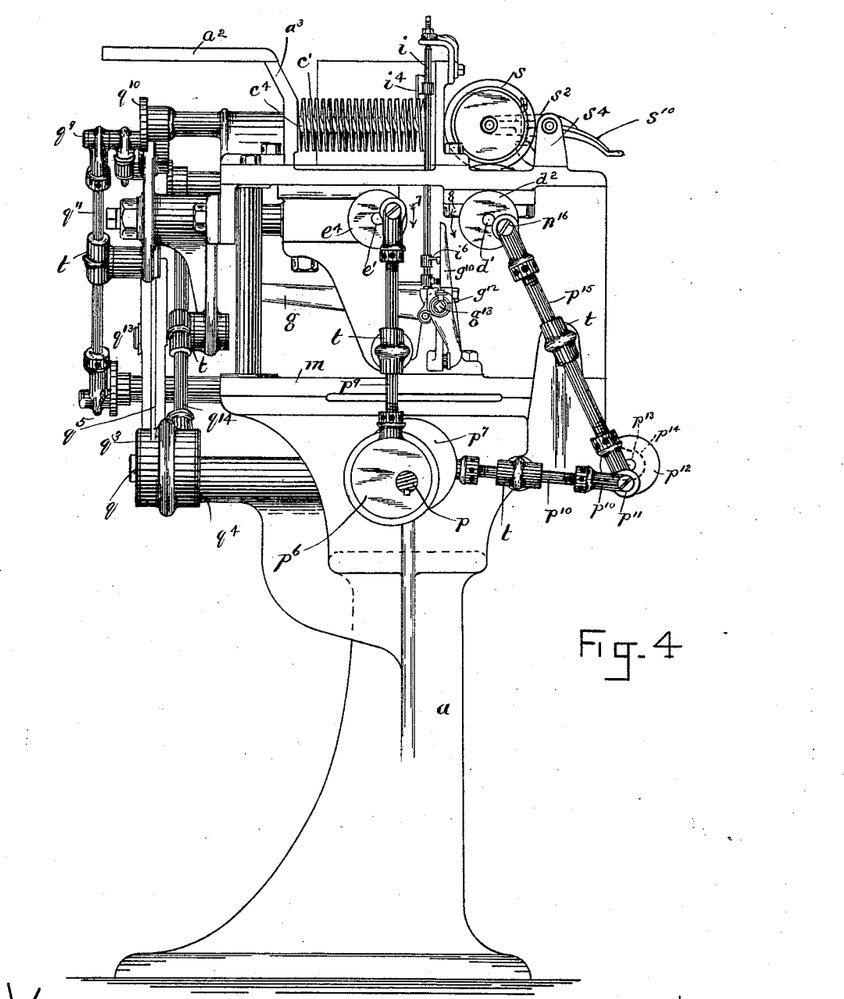
Fig. 4 represents an elevation of one side of the machine.
Figure 5:
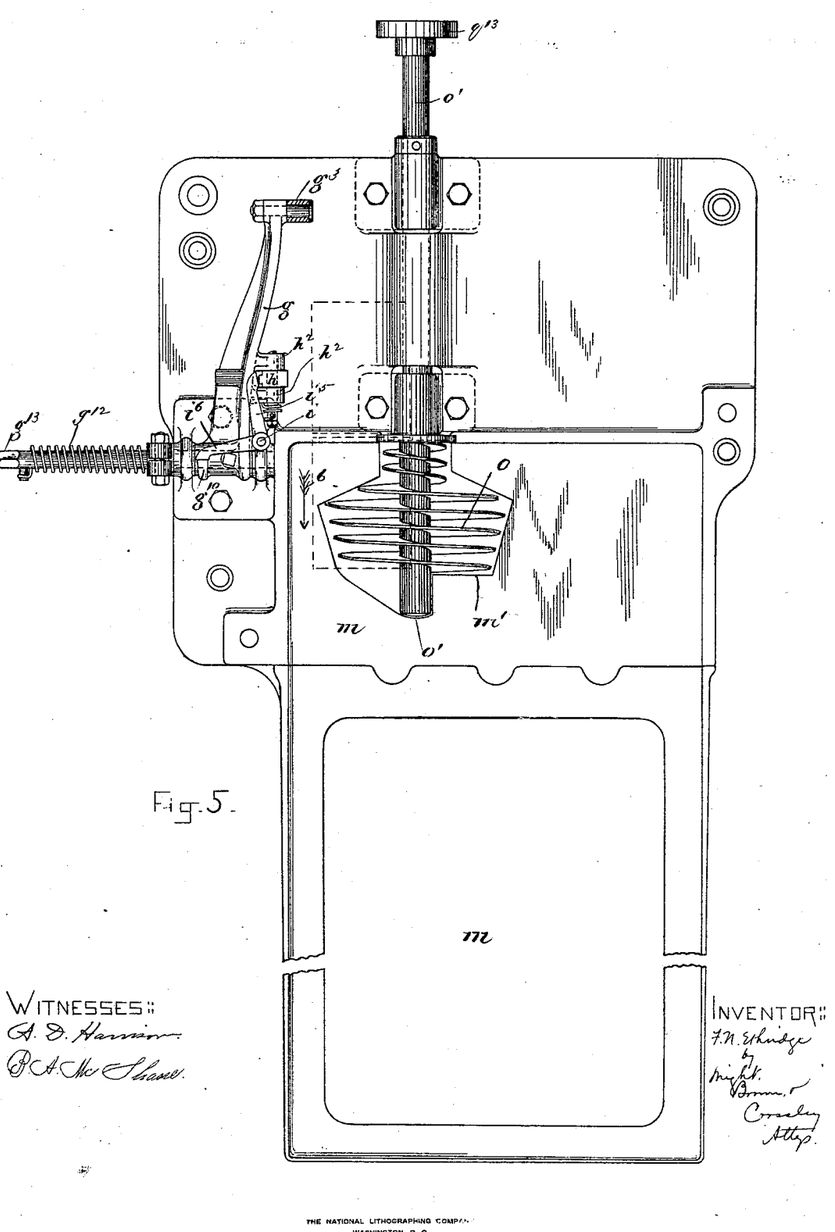
Fig. 5 represents a top plan view of the packing table and the packing device.

$m$ represents the receiving or packing table upon which the letters drop after they have passed between the printing roll and impression roll, said table being located below the feeding screws and printing devices, as best shown in Figs. 2 and 4, the table being also shown in plan in Fig. 5. The packing table $m$ has an opening $m'$ which receives the packing screw $o$. Said screw is preferably formed as shown in Letters Patent No. 449,363, dated March 31, 1891, its convolutions being of varying size, said convolutions being smallest at the end of the screw which receives the letters, and largest at the central portion of the screw, the convolutions at the delivering end being preferably somewhat smaller than those at the central part of the screw. The object of this form of screw is set forth in the last named Letters Patent, to which reference may be had. The shaft $o'$ on which the screw $o$ is formed is journaled in fixed bearings on the frame of the machine, and is continuously rotated by means hereinafter described. The printing roll and impression roll are arranged over the end of the screw having the smallest convolutions, the position of said rolls relatively to the screw $o$ being indicated by dotted lines in Fig. 5. The letters falling from the impression roll and printing roll engage the convolutions of the screw at one end thereof, and are caused by the rotation of the screw to move in the direction indicated by the arrow 6 in Fig. 5, the letters being thus moved outwardly upon the packing table and there assembled in a pack the outer end of which may be supported by a sliding weight. The operator removes the letters from the packing table from time to time, as circumstances may require.

$p$ represents the driving shaft of the machine, said shaft being driven by any suitable means, preferably by a belt $p'$ running from a suitable source of power on a pulley $p^2$ which is normally loose upon the shaft $p$, and is adapted to be engaged therewith by a clutch $p^3$ engaged with one arm of a bell-crank lever $p^4$, the other end of which may be connected by a rod $p^5$ with a treadle controlled by the operator, the arrangement being such that the operator can, by depressing the treadle, connect the pulley $p^2$ with the shaft $p$ and thus cause the machine to operate, the release of said treadle causing the disconnection of the pulley $p^2$ from the shaft $p$ and the stoppage of the operation of the machine. To one end of the shaft $p$ are affixed two eccentrics $p^6\ p^7$, relatively arranged as shown in Fig. 4. To the strap of the eccentric $p^6$ is affixed one end of a connecting rod $p^9$, the other end of which is affixed to a wrist pin on a disk $e^4$ affixed to the shaft $e'$ of the impression roll $e$, said eccentric and rod rotating the disk $e^4$ and the impression roll in the direction indicated by the arrow 7 in Fig. 4. The strap of the other eccentric $p^7$ is connected by a connecting rod $p^{10}$ with an eccentric wrist pin $p^{11}$ on a disk $p^{12}$ which is affixed to a loose shaft $p^{13}$, Fig. 2, journaled in a bearing $p^{14}$ affixed to the supporting frame. Another connecting rod $p^{15}$ connects the wrist pin $p^{11}$ with an eccentric wrist pin $p^{16}$ on a disk $d^2$ affixed to the shaft $d'$ of the printing roll $d$. The described arrangement of the eccentric $p^7$, rod $p^{10}$, wrist pin $p^{11}$, rod $p^{15}$, and wrist pin $p^{16}$ causes the rotation of the printing roll in the direction indicated by the arrow 8 in Fig. 4.

Figure 3:
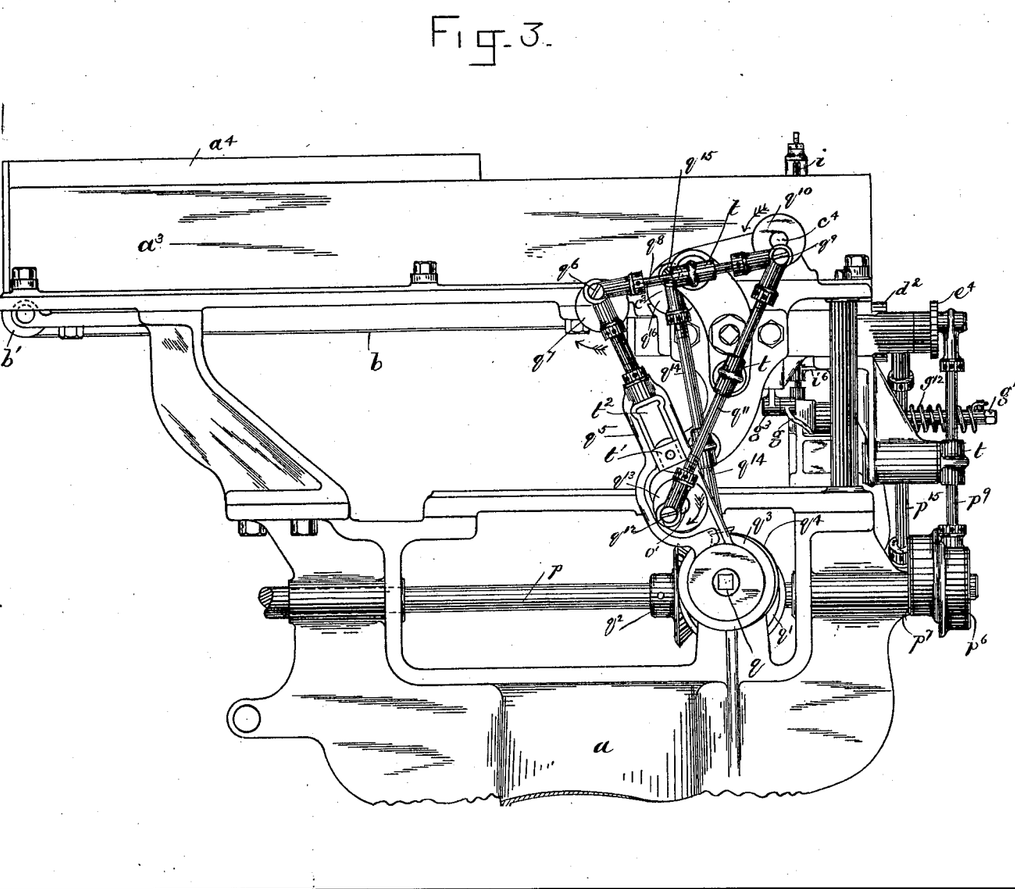
Fig. 3 represents a rear elevation.

$q$ represents a shaft arranged at right-angles to the shaft $p$, and connected with the latter by means of a beveled gear $q'$ affixed to the shaft $q$, and a similar beveled gear $q^2$ affixed to the shaft $p$, the shaft $q$ receiving motion from the shaft $p$ through said gears. To the outer end of the shaft $q$ are affixed two eccentrics $q^3$, $q^4$, relatively arranged as shown in Fig. 3. The strap $q^3$ is connected by a rod $q^5$ with an eccentric wrist pin $q^6$ on a disk $q^7$ affixed to the shaft of the pulley $b^2$ on which the feed belt $b$ runs. The wrist pin $q^6$ is connected by a rod $d^3$ with an eccentric wrist pin $q^9$ on a disk $q^{10}$ affixed to the shaft $c^4$ of the feeding screw $c'$. The wrist pin $q^9$ is connected by a rod $q^{11}$ with an eccentric wrist pin $q^{12}$ on a disk $q^{13}$ affixed to the shaft $o'$ of the packing screw. The strap of the eccentric $q^4$ is connected by a rod $q^{14}$ with an eccentric wrist pin $q^{15}$ on a disk $q^{16}$ on the shaft $c^3$ of the feeding screw $c$.

It will be seen from the foregoing, and by reference to Figs. 3 and 4, that the rotation of the shaft $q$, and the revolutions of the eccentrics $q^3$ and $q^4$, cause the simultaneous rotation of the belt-carrying pulley $b^2$, the feeding screws $c$ $c'$, and the packing screw $o$. It will also be seen that the rotation of the printing roll, the impression roll, the feeding and packing screws, and the feeding-belt-driving pulley are effected by means of eccentrics and connecting rods, the only gearing employed in the machine being that which connects the shaft $q$ with the shaft $p$. The object of the employment of the described system of eccentrics and connecting rods is to make the operation of the machine as nearly noiseless as possible. Each of the said connecting rods is provided with an oscillatory center or guide, said rods being connected with their centers or guides in such manner as to slide freely endwise, each center constituting a support for the corresponding rod having no movement except an oscillating one. The centers or guides for the rods $p^9$, $p^{10}$, $p^{15}$, $q^8$, $q^{11}$, and $q^{14}$ are sleeves $t$, affixed to studs or bosses which are journaled in fixed bearings on the supporting frame. The center or guide for the connecting rod $q^5$ is a plate or bracket $t'$, which is affixed to a stud journaled in a fixed bearing on the supporting frame, and is fitted in a slot or way $t^2$ formed in the connecting rod $q^5$, the last-named rod being therefore adapted to slide upon its center $t'$, while each of the other connecting rods slides within the corresponding center. It will be obvious that the object of said centers is to control the movement of the connecting rods and make said movements regular and definite.

$r$ $r$ represent letter-arresting fingers, which are arranged to arrest each letter falling from the feeding screws $c$ $c'$ at a point between the printing roll and the impression roll until said impression roll moves forward and grasps the letter, said fingers being adapted to yield so that while they are adapted to support the weight of the letter they will be displaced by the downward pressure exerted on the letter by the conjoint action of the printing and impression rolls when said rolls grasp and commence to move the letter. Each finger is formed on a weighted arm $r'$ (Fig. 12) which is pivoted at $r^2$ to a bearing $r^3$ on a fixed part of the machine, the fingers $r$ projecting from said arms across the path in which the letters pass in moving between the printing roll and impression roll. The arms $r'$ are free to swing on the pivots $r^2$ and normally hold the fingers $r$ in the letter arresting position shown in Fig. 12. The downward movement of the letter by the printing roll and impression roll causes the fingers $r$ to yield and permit the letter to pass by said fingers.

Figure 10:
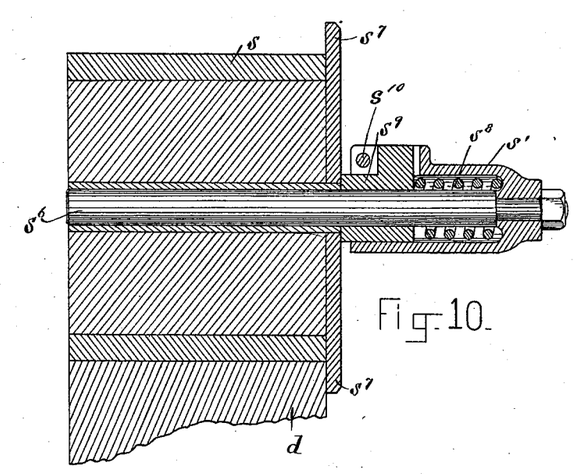
Fig. 10 represents a section on line 10 10, Fig. 6.

$s$ represents an inking roll located over the printing roll $d$ and mounted on a shaft $s^6$ Fig. 10 which is attached to a socket $s'$ formed on a lever $s^2$ which is affixed to a stud $s^3$ mounted to turn in bearings $s^4$ affixed to the supporting frame. A spring $s^5$, affixed at one end to one of the bearings $s^4$, and engaged at the other end with the stud $s^3$, exerts pressure on the lever $s^2$ in the direction required to press the inking roll downwardly upon the printing roll. The inking roll is provided with a flange $s^7$ at one end, which flange bears against the outer portion of one side or face of the printing roll $d$. The inking roll is free to move endwise on the shaft $s^6$, and its flange $s^7$ is pressed yieldingly against the face of the printing roll upon which it bears by means of a spring $s^8$ in the socket $s'$, said spring bearing on a sleeve $s^9$ adapted to move on the shaft $s^6$, and confined by a pin $s^{10}$ fastened in the bearings $s'$ said sleeve communicating the pressure of the spring to the inking roll. The object of thus applying pressure to the inking roll is to insure the rotation of the inking roll by frictional contact with the printing roll, so that the inking roll will rotate at all times without regard to the nature of the portion of the periphery of the printing roll on which it bears. The lever $s^2$ may be moved by means of a thumb piece $s^{10}$ formed upon it to raise the inking roll from the printing roll and permit the removal of the former from the shaft $s^6$.

The operation of the machine is as follows: The mail clerk, standing in suitable proximity to the table $a^2$, feeds the letters into the throat over the feeding belt $b$, each letter striking the belt on one of its longer edges, and being held in a substantially vertical position by the walls $a^3$ $a^4$. The rapid movement of said belt carries the letters forward, each letter being prevented from tipping over on its side by the walls $a^3$ $a^4$, and by a roll $u$ (Figs. 1 and 2) having a vertical axis and located at one end of the wall $a^4$. The letters acquire sufficient momentum after leaving the roll $u$ to carry them off from the feeding belt $b$ and into engagement with the feeding screws $c\ c'$, the shaft of the screw $c'$ arresting the endwise movement of each letter, as already described. The screws $c\ c'$ immediately move each letter engaged with them out of the path in which they are moved by the feeding belt and toward the printing mechanism. Each letter as it approaches the delivering ends of the screws $c\ c'$ is pressed by said screws against the plate $i^4$ on the arm $i^3$, thus turning the shaft $i$ and throwing the clutch or dog $h$ into engagement with the reciprocating actuating device $f$, the result being the depression of the lever $g$ and the movement of the impression roll toward the printing roll in the manner already described. The arm $i^3$ is moved away from the letter by the action of the arm $g^{10}$ on the lever $g$ on the arm $i^6$ of the shaft $i$, as above described, so that the letter is free to drop between the printing roll and impression roll. The machine is timed so that the letter reaches the arresting fingers $r$ before the impression roll has moved forward far enough to grasp the letter, so that when the printing roll and impression roll commence to move the letter the impression made by the printing roll on the face of the letter will be at a definite predetermined distance from the lower or advancing edge of the letter. The movement given the letter by the printing roll and impression roll causes it to displace the fingers $r$, and when the letter is released by said rolls it drops into the packing screw $o$, by which it is moved outwardly upon the packing table $m$, as above indicated.

I claim—

1. In a machine for marking mail matter, the combination of marking means, including a marking and impression roll normally separated from each other and one movable toward and from the other, a reciprocating mover, a lever having a movable abutment normally retracted from the path of said reciprocating mover, letter-actuated devices for moving said abutment into the said mover's path, and suitable connections between the lever and the movable roll whereby said lever's vibration received from the mover carries said roll toward the other roll.

2. In a machine for marking mail matter, the combination, substantially as hereinbefore set forth, of a letter-conveying belt, a positive letter feed which receives letters from the belt and moves them laterally out of the path in which they are moved by the belt, and printing mechanism to which the letters are presented by said positive feed.

3. In a machine for marking mail matter, the combination of a letter-conveying belt, two feeding screws on positively rotated shafts arranged substantially at right angles to the direction of movement of the belt, one of said shafts being higher than the belt and adapted to serve as a stop for the letters delivered by the belt, while the other shaft, which is located between the said belt and stop, is located at a lower point, said screws constituting a positive feed adapted to engage the letters delivered by the belt and move them laterally out of the path in which they are moved by the belt, as set forth.

4. In a machine for marking mail matter, the combination of two feeding screws on positively rotated shafts, one arranged at a higher point than the other, printing mechanism including a printing roll and an impression roll, both located at a lower point than said screws, one of said rolls being laterally movable toward and from the other, normally inoperative means for actuating said laterally-movable roll toward the other roll, and letter-controlled devices for rendering said actuating means operative, comprising a shaft having an arm or projection located in the path through which the letters are moved by said screws and another arm arranged to co-act with the clutch which completes the operative connection of the roll-actuating means.

5. In a machine for marking mail matter, the combination of printing mechanism, including a printing roll and an impression roll, a carriage supporting the latter and movable with it toward and from the printing roll, carriage-moving mechanism consisting of two normally separated parts, namely, first, a continuously-moving actuating device, and, secondly, a lever and devices adapted to be operated thereby to move the carriage, a dog or clutch on said lever adapted, when displaced from its normal position, to enter the path of said actuating device, receive motion therefrom, and impart said motion to the lever, a positive letter feed adapted to move letters laterally toward the printing mechanism, and a clutch-shifting device arranged to be moved by a letter impelled by said feed, and to throw said clutch into the path of the actuating device, as set forth.

6. In a machine for marking mail matter, the combination of printing mechanism, including a printing roll and an impression roll, a carriage supporting the impression roll and movable with the latter toward and from the printing roll, a collar having a cam groove affixed to said carriage, a stud fitted to rotate in said collar and provided with a roll or projection located in said groove, the groove being so formed that the movements of the rolls therein, caused by the rotary movements of the stud, move the collar, carriage, and impression roll toward and from the printing roll, a lever connected with said stud and adapted to impart motion thereto, a reciprocating slide or actuating device continuously operated by the power of the machine, a dog or clutch on said lever normally out of the path of said actuating device, and moved into said path when displaced, a letter-operated clutch-shifting device adapted to displace said clutch and thereby cause the movement of the lever in the direction required to move the impression roll toward the printing roll, and a spring which moves said lever in the opposite direction and thereby retracts the impression roll, as set forth.

7. In a machine for marking mail matter, the combination of printing mechanism, including a printing roll and an impression roll, a carriage supporting the impression roll and movable with the latter toward and from the printing roll, normally inoperative carriage-moving mechanism consisting of a continuously-moving actuating device, a lever, and devices adapted to be operated thereby to move the carriage, a dog or clutch on said lever adapted, when displaced from its normal position, to enter the path of said actuating device, receive motion therefrom, and impart motion to the lever, a positive letter feed adapted to move letters laterally toward the printing mechanism, a clutch-displacing device, comprising a shaft having an arm or projection, such as $i^3$, located in the path in which letters are moved by said feed, and another arm arranged to displace said clutch and cause the movement of the lever by the actuating device, an arm, such as $g^{10}$, moving with said lever, and an arm, such as $i^6$, on the said shaft arranged to be moved by the arm $g^{10}$ and to turn the shaft in the direction required to separate the arm $i^3$ from a letter pressed thereagainst by the feed, as set forth.

8. In a machine for marking mail-matter, the combination of a letter-conveying belt, feeding screws arranged to receive letters from said belt and feed them positively out of the path of the belt, printing mechanism, including a printing roll and an impression roll, both located below the plane in which the letters are fed by said screws, normally inoperative mechanism for moving the impression roll toward the printing roll, said mechanism comprising a clutch and a letter-operated clutch-shifting device through which the clutch is made operative by a letter moved by said feeding screws, and mechanism for rotating said feeding screws and the printing and impression rolls in time with each other, substantially as set forth.

9. In a machine for marking mail matter, the combination of feeding screws arranged to positively feed letters laterally, printing mechanism including a printing roll and an impression roll, the shafts $p$ and $q$ suitably connected, eccentrics on said shafts, and a system of rods connecting said eccentrics with wrist pins on the shafts of the said feeding screws and rolls, said rods being movable endwise in centers journaled in fixed bearings, as set forth.

10. In a machine for marking mail matter, the combination of a letter-conveying belt, feeding screws arranged to receive letters from said belt, printing mechanism including a printing roll and an impression roll, located below the path in which letters are fed by said screws, a packing screw located below said printing roll and impression roll, the connected shafts $p$ and $q$, eccentrics on said shafts, and a system of rods connecting said eccentrics with the belt driving pulley, the shafts of the feeding screws, the shafts of the printing and impression rolls, and the shaft of the packing screw, said rods being controlled by centers journaled in fixed bearings, as set forth.

11. In a machine for marking mail matter, the combination of a printing roll, an inking roll supported by and movable on a stud, said inking roll having a flange bearing on one side of the printing roll, and a spring arranged to press said flange against the side of the printing roll, as set forth.

12. In a machine for marking mail matter, the combination of a printing roll and an impression roll, which are normally separated, letter-controlled mechanism for bringing them together, and yielding fingers arranged to support a letter at a point between said rolls, said fingers being adapted to yield to the movement imparted to the letter by said rolls as set forth.

In testimony whereof I have signed my name to this specification, in the presence of two subscribing witnesses, this 10th day of September, A. D. 1891.

FRANK N. ETHRIDGE.

Witnesses:
C. F. BROWN,
EWING W. HAMLEN.